US011155317B2

(12) United States Patent
Bigard et al.

(10) Patent No.: US 11,155,317 B2
(45) Date of Patent: Oct. 26, 2021

(54) BIKE FRAME

(71) Applicant: LOOK CYCLE INTERNATIONAL, Nevers (FR)

(72) Inventors: Pierre Bigard, Meru (FR); Frédéric Caron, Auch (FR); Julien Pavard, Marzy (FR)

(73) Assignee: LOOK CYCLE INTERNATIONAL, Nevers (FR)

( * ) Notice: Subject to any disclaimer, the term of this patent is extended or adjusted under 35 U.S.C. 154(b) by 246 days.

(21) Appl. No.: 16/443,253

(22) Filed: Jun. 17, 2019

(65) Prior Publication Data

US 2020/0156726 A1 May 21, 2020

(30) Foreign Application Priority Data

Jun. 27, 2018 (FR) ...................................... 18 55814

(51) Int. Cl.
*B62K 3/08* (2006.01)
(52) U.S. Cl.
CPC ...................................... *B62K 3/08* (2013.01)
(58) Field of Classification Search
CPC ...................................................... B62K 3/08
USPC ...................................................... 280/281.1
See application file for complete search history.

(56) References Cited

U.S. PATENT DOCUMENTS

| | | | | |
|---|---|---|---|---|
| 10,919,592 | B2* | 2/2021 | D'Aluisio | B62K 19/36 |
| 2002/0033586 | A1* | 3/2002 | Vroomen | B62K 19/06 |
| | | | | 280/274 |
| 2008/0036171 | A1* | 2/2008 | Vroomen | B62J 9/40 |
| | | | | 280/281.1 |
| 2010/0096832 | A1* | 4/2010 | Pinarello | B62K 3/04 |
| | | | | 280/281.1 |
| 2012/0061941 | A1* | 3/2012 | Choi | B62K 19/00 |
| | | | | 280/281.1 |
| 2012/0126508 | A1 | 5/2012 | Tortola | |
| 2012/0146311 | A1 | 6/2012 | Williams | |

FOREIGN PATENT DOCUMENTS

FR 2807995 10/2001
KR 101740038 6/2017

OTHER PUBLICATIONS

International Search Report dated Feb. 27, 2019.

* cited by examiner

*Primary Examiner* — Minnah L Seoh
*Assistant Examiner* — Felicia L. Brittman
(74) *Attorney, Agent, or Firm* — Ipsilon USA, LLP

(57) ABSTRACT

A bike frame includes including a seat tube (10) for receiving a seatpost (2), a front portion comprising a top tube (13) connecting the seat tube (10) to a head tube (16), the seat tube (10), the top tube (13). The head tube (16) extends in a plane of symmetry of the bike frame (1). A rear portion has two chain stays (11a, 11b) and two seat stays (12a, 12b) arranged symmetrically relative to the plane of symmetry of the bike frame (1). The two seat stays (12a, 12b) are independent of each other and the two seat stays (12a, 12b) have a preform that is curved along at least one arc in a plane passing through the two seat stays, so as to enable the two seat stays to move away from or closer to each other under the action of a vertical load.

9 Claims, 4 Drawing Sheets

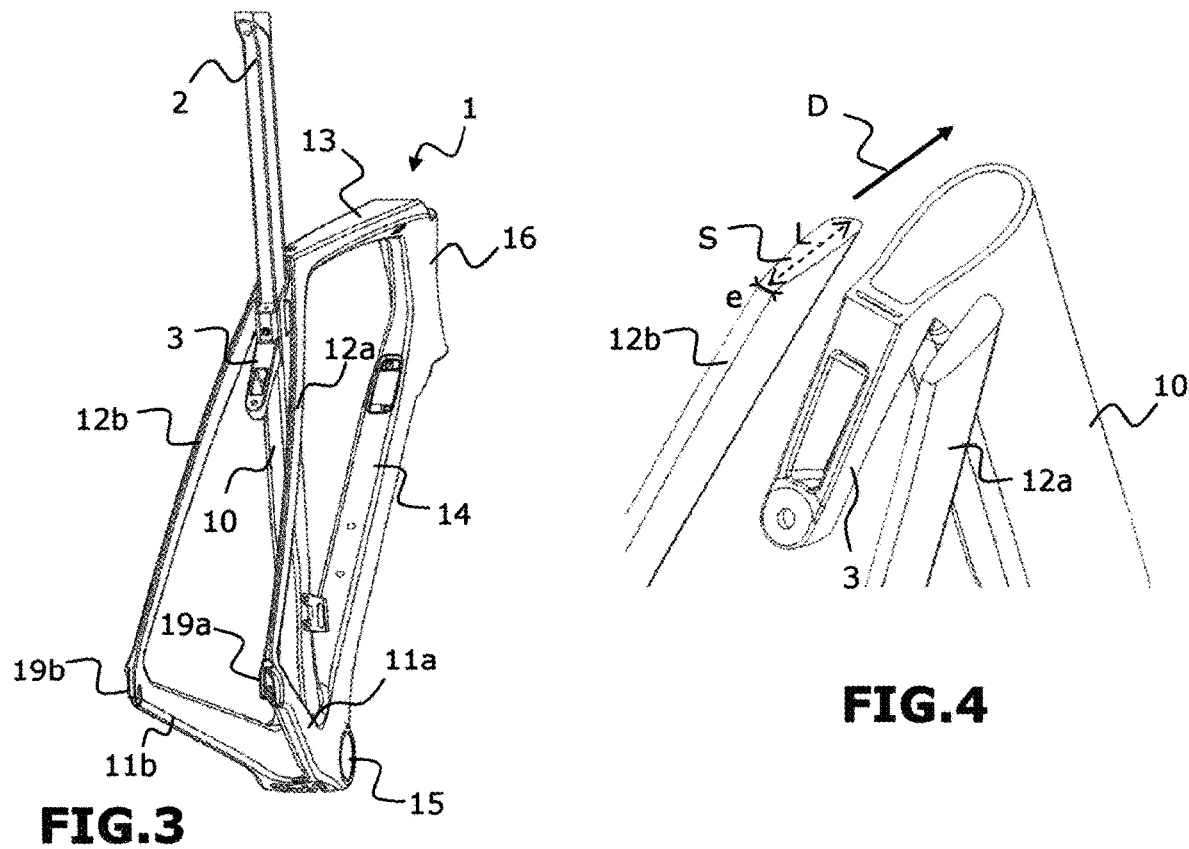
FIG.3
FIG.4
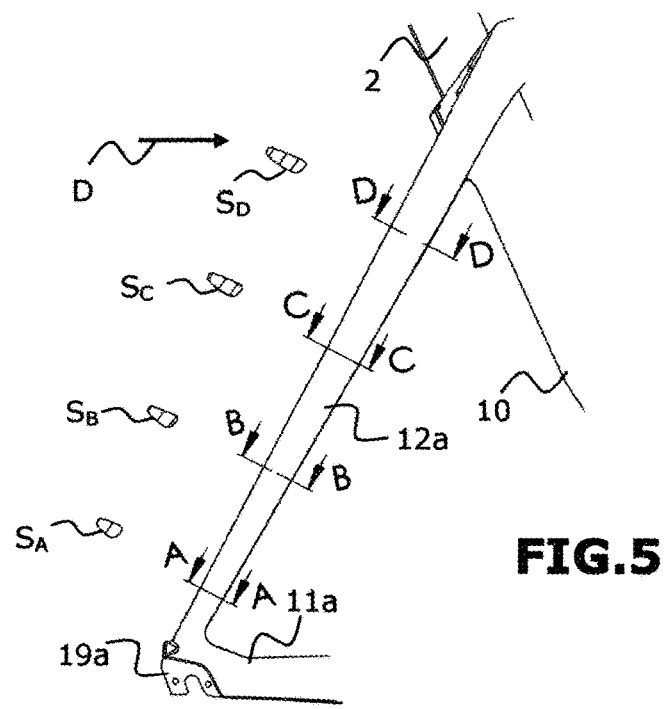
FIG.5

BIKE FRAME

FIELD OF THE INVENTION

The present invention claims the benefit of priority from French Patent Application No. 18 55814, filed on Jun. 27, 2018, the entirety of which is incorporated by reference.

BACKGROUND

Description of the Related Art

The present invention generally relates to the field of bikes or bicycles, and more specifically to a bike frame the seat stays of which are aerodynamic while forming shock absorption means.

The frame of a bike is the element that connects the main elements of the bike together. As can be seen in the example in FIG. 1, a conventional bike 1 is generally made up of two portions arranged on either side of a seat tube 10 of the frame, capable of receiving a seatpost (not shown), namely:
- a rear portion, commonly known as the rear triangle, including two chain stays 11a, 11b and two seat stays 12a, 12b arranged symmetrically relative to the plane of symmetry of the frame, to receive the hub of a rear wheel (not shown) in the joint areas between each chain stay and its associated seat stay;
- a front portion, commonly known as the front triangle, conventionally including a top tube 13, a head tube (not shown in FIG. 1) to receive the front fork (not shown) of the bike, a down tube 14 and a bottom bracket 15.

The seat tube 10, the top tube 13 and the head tube extend in the plane of symmetry of the bike frame. The two chain stays 11a, 11b and the two seat stays 12a, 12b are arranged symmetrically relative to the plane of symmetry of the bike frame.

Different frame shapes exist depending on the specific use for which the bike is intended. For example, in a geometry considered traditional, the frame is designed so that in the normal position of a bike provided with such a frame (i.e. with a front wheel and a rear wheel in contact with a ground surface and in a vertical orientation of the plane of symmetry of the frame), the top tube extends generally approximately parallel to the surface of the ground. FIG. 1 shows another more compact geometry of the frame, particularly suited to road bikes, in which the top tube 13 slopes downwards from the head tube to the seat tube 10, and the seat stays 12a, 12b connect to the seat tube 10 at approximately the same height as the top tube. This oblique tube configuration is known by the term "sloping tube". This geometry particularly enables cyclists of small stature to not be bothered by this top tube when they need to put their foot on the ground.

In addition, in the example shown, each seat stay 12a, 12b has a perpendicular cross-sectional profile that is elongated in a direction parallel to the plane of symmetry. In other words, the seat stays have a smaller width viewed from the rear of the frame than the width thereof viewed from the side, which gives the bike provided with such a frame good aerodynamics. However, this type of bike is generally uncomfortable due to the high vertical stiffness of the frame. This stiffness is all the greater in that the frame conventionally includes a part 12c forming a bridge mechanically connecting the two seat stays 12a, 12b, this part generally acting as a support for mounting a rear rim brake (not shown).

The comfort of the bike is achieved in particular through the filtering of vibrations and small shocks. The design of the rear portion of the bike frame greatly influences the cyclist's comfort on the seat. A number of shock absorption solutions on the rear portion of the bike thus already exist. Among these solutions, U.S. Pat. No. 9,010,790 discloses a bicycle frame the two seat stays of which extend beyond the seat tube and connect directly to the top tube without being rigidly connected to the seat tube. When such a frame is subjected to a vertical load (for example the weight of a cyclist sitting on the seat of the bike provided with such a frame), the seat tube slopes rearwards and downwards relative to the neutral position thereof (without a vertical load), and the associated chain stays and seat stays pivot upwards from the bottom bracket relative to the neutral positions thereof. In other words, a vertical load generates vertical bending of the seat stays, parallel to the plane of symmetry in the vertical orientation thereof. Although this type of solution enabling the vertical bending of the seat stays provides improved comfort for the cyclist, in order for the vertical bending of the seat stays to be sufficient, the seat stays must have a perpendicular cross-sectional profile that is elongated in a direction perpendicular to the plane of symmetry. In other words, the seat stays viewed from the side of the frame must have a smaller width than the width thereof viewed from the rear of the frame. These profiles give a larger face area and increase drag, which reduces the aerodynamics.

As a result, none of the solutions of the prior art makes it possible to offer both improved comfort and improved aerodynamics.

OBJECTS AND SUMMARY

The present invention aims to overcome the limitations of the prior art and, to this end, relates to a bike frame including a seat tube configured to receive a seatpost, a front portion comprising a top tube connecting the seat tube to a head tube, said seat tube, said top tube and said head tube extending in a plane of symmetry of the bike frame, and a rear portion comprising two chain stays and two seat stays arranged symmetrically relative to the plane of symmetry of the bike frame, characterized in that each seat stay has a perpendicular cross-sectional profile that is elongated in a direction parallel to the plane of symmetry, in that the two seat stays are independent of each other and in that the two seat stays have a preform that is curved along at least one arc in a plane passing through the two seat stays, so as to enable the two seat stays to move away from or closer to each other under the action of a vertical load.

According to further possible features, a bike frame according to the present invention can also include the following characteristics, taken individually or in combination:
- the preform can be curved towards the outside of the bike frame;
- as a variant, the preform can be curved towards the inside of the bike frame;
- as a variant, the preform includes a series of arcs alternately curved towards the inside and then towards the outside of the bike frame;
- the two seat stays are each preferably connected to a front lateral half of the seat tube;
- the two seat stays can each be connected to the top end of the seat tube;
- the frame can also include a rim brake fastening lug that extends in the plane of symmetry of the frame, from the seat tube towards the rear portion;

- as a variant, the frame can also include a fastening element rigidly connected to a bottom bracket of said bike frame to support a rim brake under the two chain stays;
- as a variant, the frame can also include a supporting element provided at the end of each seat stay at the joints with the chain stays, to support a rear disc brake.

BRIEF DESCRIPTION OF THE DRAWINGS

The invention and the advantages that it provides will be better understood on reading the following description of an embodiment, given with reference to the attached figures, in which:

FIG. 3 shows a rear three-quarter view of the assembly in FIG. 2;

FIG. 4 is a cross-sectional view of a top portion of the frame in FIG. 2, showing a section of the top portion of the seat tube and the seat stays;

FIG. 5 is an enlargement of a zone R in FIG. 2, showing an example of variations in profile of the seat stays along the length thereof;

DETAILED DESCRIPTION

Hereinafter, unless otherwise specified, all elements common to the different figures have the same reference signs.

Furthermore, terms relating to directions or positions, such as front or rear, are used relative to the position of a bicycle having a front wheel and a rear wheel in contact with a horizontal ground surface and in a vertical orientation.

Figure 1:
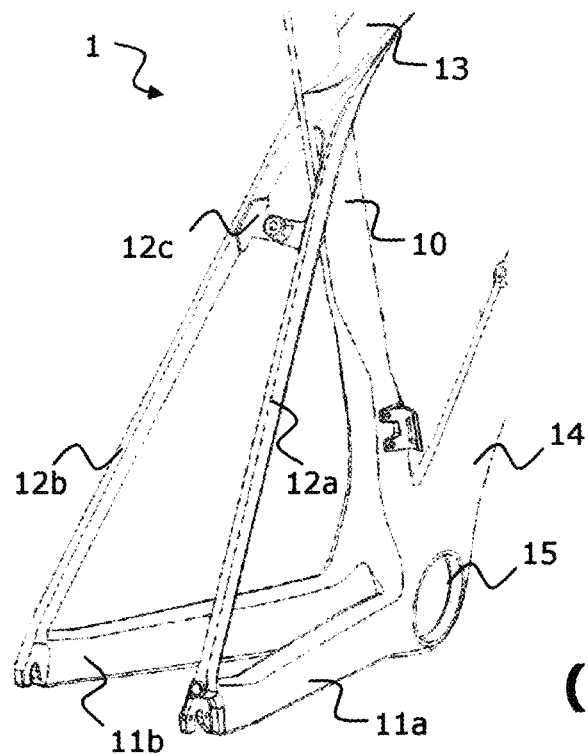
FIG. 1, described above, shows a partial rear three-quarter perspective view of a rear portion of an aerodynamic bike frame of the prior art.
Figure 2:
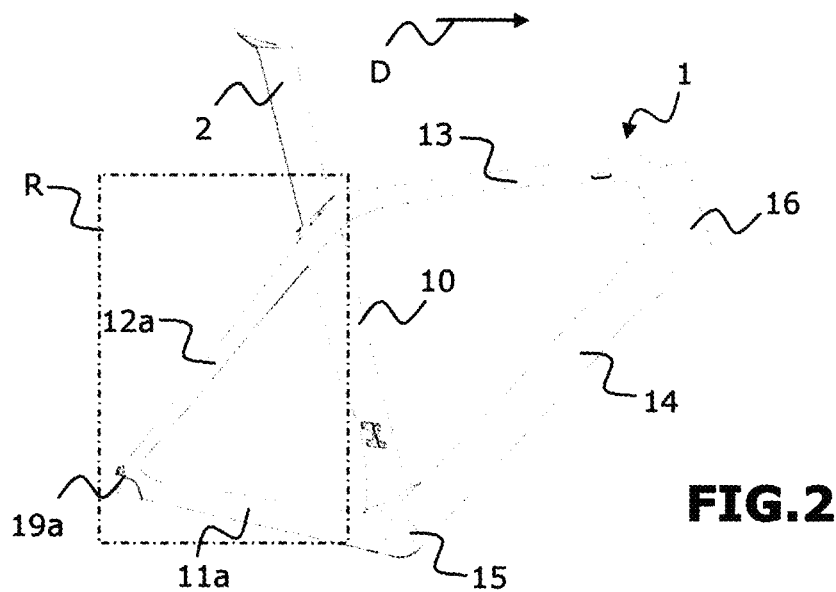
FIG. 2 shows a side view of an assembly made up of a seatpost and a bike frame according to one possible embodiment of the invention.

FIGS. 2 and 3 show a side view and a rear three-quarter view of an assembly made up of a bike frame according to one possible embodiment of the invention and a seatpost 2. The bike frame 1 conventionally includes, like the frame of the prior art shown in FIG. 1, a seat tube 10 configured to receive the seatpost 2, a rear portion including two chain stays 11a, 11b and two seat stays 12a, 12b, and a front portion conventionally including a top tube 13, a down tube 14, a bottom bracket 15 and a head tube 16.

The top tube 13 is connected, at a first end, to the head tube 16 and, at a second end, to the seat tube 10. The down tube 14 is connected, at a first end, to the head tube 16 and, at a second end, to the bottom bracket 15. The seat tube 10 is connected at the bottom end thereof to the bottom bracket 15.

The longitudinal axes of the seat tube 10, the top tube 13, the head tube 16 and the down tube 14 are all located in the same plane, known as the plane of symmetry of the frame. The chain stays 11a, 11b and the seat stays 12a, 12b are arranged symmetrically relative to the plane of symmetry of the frame. More specifically, the chain stay 11a is connected at a first end to the bottom bracket 15, and at a second end to the seat stay 12a, while the chain stay 11b is connected at a first end to the bottom bracket 15, and at a second end to the seat stay 12b. The joint areas between the chain stay 11a and the seat stay 12a, and the chain stay 11b and the seat stay 12b, include fastening lugs 19a, 19b capable of receiving a hub of a rear wheel (not shown) of the bike to couple the rear wheel rotatably to the frame.

The different elements of the frame 1 are preferably made from a carbon fibre-based composite material or another composite material and moulded in a single unit or in several individual units that are then coupled together. The advantage of composite materials is that they can be formed into a variety of shapes and structures for bicycle frames. Other materials, for example aluminium, can nonetheless be envisaged for all or some of the elements of the frame.

The principle on which the present invention is based is that of proposing a design for seat stays that will be able to deform in a lateral direction relative to the plane of symmetry of the frame, working particularly in buckling, under the action of a generally vertical load.

This lateral deformation is made possible by combining several features that will now be described:

According to a first feature of the invention, each seat stay 12a, 12b has a perpendicular cross-sectional profile that is elongated in a direction parallel to the plane of symmetry of the frame. "Perpendicular cross-sectional profile" is given to mean a profile in a plane perpendicular to the longitudinal axis of the seat stay. This feature can be seen in particular in FIG. 4, in which a profile S of the seat stay 12b has a generally elliptical shape, with a dimension "e" perpendicular to the plane of symmetry of the frame that is smaller than the dimension "L" parallel to the plane of symmetry of the frame (or here, the direction of travel of a bike provided with the frame, shown in the figures by an arrow D).

The perpendicular cross-sectional profile can be constant over the entire length of the seat stays 12a, 12b. As a variant, this profile can be variable. Thus, FIG. 5 shows a possible variation of profiles $S_A$, $S_B$, $S_C$ and $S_D$ of the seat stay 12a corresponding respectively to the cross sections along the lines A-A, B-B, C-C and D-D. Here, the profiles increase from the bottom end of the seat stay 12a to the top end thereof. As a result, the largest widthwise dimension of the profiles $S_A$, $S_B$, $S_C$ and $S_D$ of the seat stay 12a is still the dimension that extends parallel to the plane of symmetry of the frame. The seat stays 12a, 12b thus offer very little wind resistance when the bike is travelling, which give the bike good aerodynamics.

According to a second feature of the invention, the two seat stays 12a, 12b are independent of each other. "Independent" is given to mean that there is no part mechanically connecting the two seat stays together, apart from the part to which the top end of the seat stays is connected. In particular, the frame according to the invention does not include a bridge 12c to support a rim brake.

According to a third feature of the invention, when the frame 1 is at rest, the two seat stays 12a, 12b have a preform that is curved along at least one arc in a plane passing through these two seat stays. For example, in FIG. 6, which shows a rear view of the bike frame 1, the two seat stays 12a, 12b have a preform curved towards the outside of the bike frame, unlike the straight seat stays in FIG. 1, which would have followed the two straight dashed lines shown in FIG. 6. In this configuration, when the frame is subjected to a vertical load, such as the load shown by the arrow F in FIG.

Figure 6:
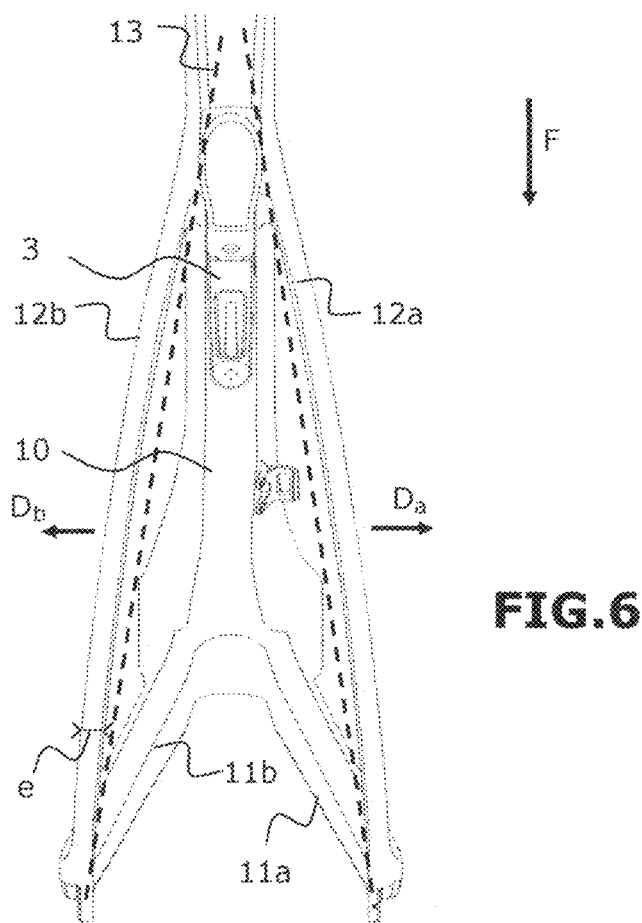
FIG. 6 shows a rear view of the frame only of the assembly in FIG. 2, without the seatpost.

6, the seat stays will be able to deform laterally, moving away from each other, as represented by the two arrows $D_a$ and $D_b$ in FIG. 6.

In another embodiment, not shown, the preform of the seat stays is curved towards the inside of the bike frame. In this case, when the frame is subjected to a vertical load, the seat stays will still be able to deform laterally, this time by moving closer to each other.

The preform of the seat stays viewed from the rear can have a constant radius of curvature. As a variant, the preform of the seat stays viewed from the rear can have variable radii of curvature over the length thereof.

Provision can also be made for the preform of the seat stays to include a portion curved towards the outside followed by a portion curved towards the inside of the frame, or, more generally, a series of portions of arcs alternately curved towards the inside and then towards the outside of the bike frame.

In any event, the seat stays can deform laterally under the action of a vertical load, and move closer to and/or away from each other.

Figure 7A:
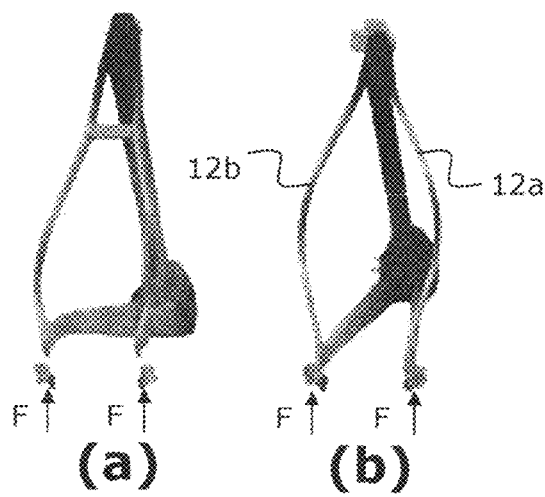
FIGS. 7a and 7b show comparative deformation tests for a frame according to the prior art and a frame according to the invention.
Figure 7B:
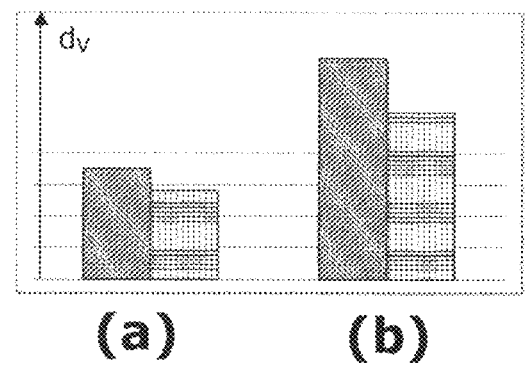

A comparison of the deformations of the seat stays obtained for the frame according to the invention shown in FIG. 2 et seq, and for the frame of the prior art shown in FIG. 1, is given in FIGS. 7a and 7b. For both frames, the test consisted of securing the rear portion of the frames, at the top tube and the bottom bracket, and laterally at the joints between the chain stays and seat stays, so as to simulate the presence of a rear wheel. A force F was then applied upwards at the joints between the chain stays and the seat stays. Section (a) of FIG. 7a shows the deformation obtained with the frame in FIG. 1, on which the seat stays are straight in the rest position and connected by a brake supporting bridge, while section (b) of FIG. 7a shows the deformation obtained with a frame according to the invention. The test was carried out with a force F equal to 1,000 Newtons, and then a force F equal to 2,000 Newtons. The vertical displacement $d_v$ values of the axis of the rear wheel were measured in each case, with the results shown in FIG. 7b. In this FIG. 7b, section (a) corresponds to the results obtained for the frame in FIG. 1, and section (b) corresponds to the results obtained for the frame according to the invention, for a force of 2,000 Newtons (hatched rectangle) and for a force of 1,000 Newtons (checked rectangle) respectively. The lateral deformations of the seat stays according to the invention are greater than the lateral deformations obtained in the same conditions with the straight seat stays in FIG. 1. This results in approximately 20% greater displacement for the frame according to the invention, which translates into improved comfort for the cyclist.

Further tests highlighted firstly the effect of the profiles of the seat stays on the results obtained in terms of lateral displacement, and secondly the preponderance of the lateral deformation of the seat stays over any vertical deformation. The tests were simulated for aluminium frames with solid tubes.

In Table 1 below, it can be seen in particular that the aerodynamic profile of the seat stays 12a, 12b of the frame according to the invention makes it possible to obtain three times more lateral displacement than is obtained on a cylindrical profile seat stay for the same vertical load of 100 Newtons:

TABLE 1

|  | Lateral displacement (parallel to the axis of rotation of the rear wheel) [mm] | Forward displacement (along the longitudinal axis of the seat stay) [mm] |
|---|---|---|
| Seat stays 12a, 12b | 10.13 | 1.47 |
| Cylindrical seat stay | 3.34 | 3.34 |

In Table 2 below, it can be seen that the seat stays 12a, 12b according to the invention, subjected during the test to a vertical load of 2,000 Newtons, deform mainly in the lateral direction:

TABLE 2

|  | Proportion of maximum displacement |
|---|---|
| Direction parallel to the axis of the rear wheel | 80% |
| Direction perpendicular to the axis of the rear wheel | 20% |

It will be easily understood that the results obtained in terms of lateral deformation of the preformed seat stays according to the invention also depend on the length of these seat stays. Tests have shown that the lateral deformation of a seat stay with a curved preform is proportional to the length of this seat stay. Thus, the longer the seat stays, the better the lateral deformation obtained under the action of a vertical load.

The length of the seat stays can be optimized by judicious selection of the area in which the top end of the seat stays 12a, 12b will be connected. Of course, the decision also depends on the type of frame, according to whether its geometry is traditional or compact.

Figure 8:
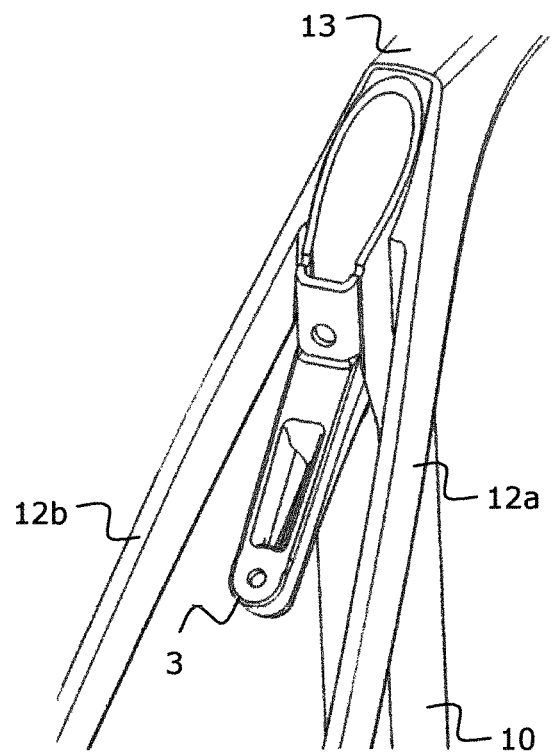
FIG. 8 shows a rear three-quarter view of a top part of the frame only of the assembly in FIG. 2, without the seatpost.
Figure 9:
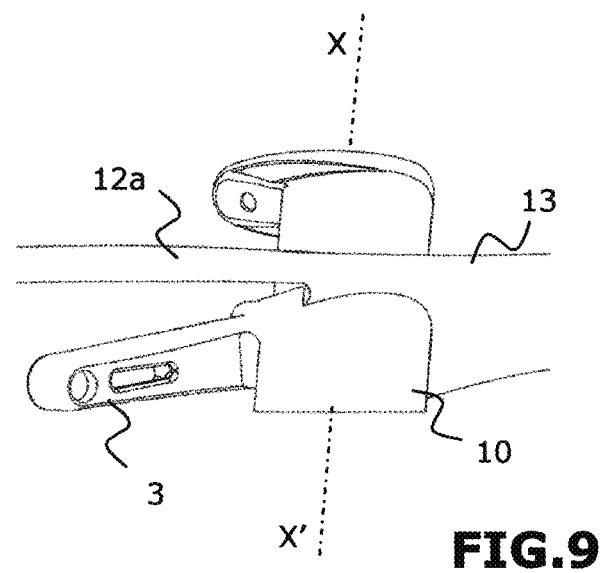
FIG. 9 shows a partial bottom view showing a seat stay fastening zone.

In the embodiment shown in FIG. 2 et seq, given as a non-limitative example, the top end of the seat tube 10 is at approximately the same level as the joint area between the seat tube 10 and the top tube 13. As can be seen more particularly in FIGS. 8 and 9, in this case the decision is advantageously made to connect the top end of each seat stay 12a, 12b to an area of the seat tube 10 placed as far forward as possible on the seat tube 10, here for example to the lateral front half of the seat tube 10, beyond the longitudinal axis XX' of the seat tube 10.

In another possible embodiment, not shown, the top end of each seat stay could be coupled directly to the top tube of the frame, with the seat stays extending beyond the seat tube in this case.

In other frame configurations in which the top tube is connected to an intermediate portion of the seat tube, preference will be given to fastening the top end of the seat stays at the top end of the seat tube, as high up as possible and as far forward as possible on the seat tube.

As has been stated above, the frame according to the invention cannot include a rear brake supporting bridge connecting the two seat stays, as such a bridge would prevent the seat stays from moving closer to or away from each other under the action of a vertical load. When the use of the frame is envisaged in combination with a rear rim brake, the frame of the invention can include a fastening lug 3 for a rim brake that extends in the plane of symmetry of the frame, from the seat tube 10 towards the rear portion (see FIGS. 3, 4, 6, 7 and 8), without contact with the seat stays.

This fastening lug 3 can be moulded with the seat tube 10 or affixed to the seat tube 10, for example by gluing. This fastening lug thus in no way hinders the lateral displacement of the seat stays. In addition, the fastening lug remains concealed behind the seat tube, which further contributes to the aerodynamics. As a variant, a rear rim brake can also be supported under the two chain stays 11a, 11b by a fastening element rigidly connected to the bottom bracket 15 of the bike frame 1. For a rear disc brake, a supporting element can be provided at the end of each seat stay at the joints with the chain stays.

The invention claimed is:

1. A bike frame comprising:
a seat tube configured to receive a seatpost,
a front portion comprising a top tube connecting the seat tube to a head tube, said seat tube, said top tube and said head tube extending in a plane of symmetry of the bike frame, and
a rear portion comprising two chain stays and two seat stays arranged symmetrically relative to the plane of symmetry of the bike frame,
wherein each seat stay has a perpendicular cross-sectional profile that is elongated in a direction parallel to the plane of symmetry, in that the two seat stays are independent of each other and in that the two seat stays have a preform that is curved along at least one arc in a plane passing through the two seat stays, so as to enable the two seat stays to move away from or closer to each other under the action of a vertical load.

2. The bike frame according to claim 1, wherein the preform is curved towards the outside of the bike frame.

3. The bike frame according to claim 1, wherein the preform is curved towards the inside of the bike frame.

4. The bike frame according to claim 1, wherein the preform includes a series of arcs alternately curved towards the inside and then towards the outside of the bike frame.

5. The bike frame according to claim 1, wherein the two seat stays are each connected to a front lateral half of the seat tube.

6. The bike frame according to claim 1, wherein the two seat stays are each connected to the top end of the seat tube.

7. The bike frame according to claim 1, wherein said bike frame also includes a fastening lug for a rim brake that extends in the plane of symmetry of the frame, from the seat tube towards the rear portion.

8. The bike frame according to claim 1, wherein said bike frame also includes a fastening element rigidly connected to a bottom bracket of said bike frame to support a rim brake under the two chain stays.

9. The bike frame according to claim 1, wherein said bike frame also includes a supporting element provided at the end of each seat stay at the joints with the chain stays to support a rear disc brake.

* * * * *